Jan. 20, 1925.
L. DRAGON
SAW
Filed Oct. 18, 1923
1,523,518
3 Sheets-Sheet 1
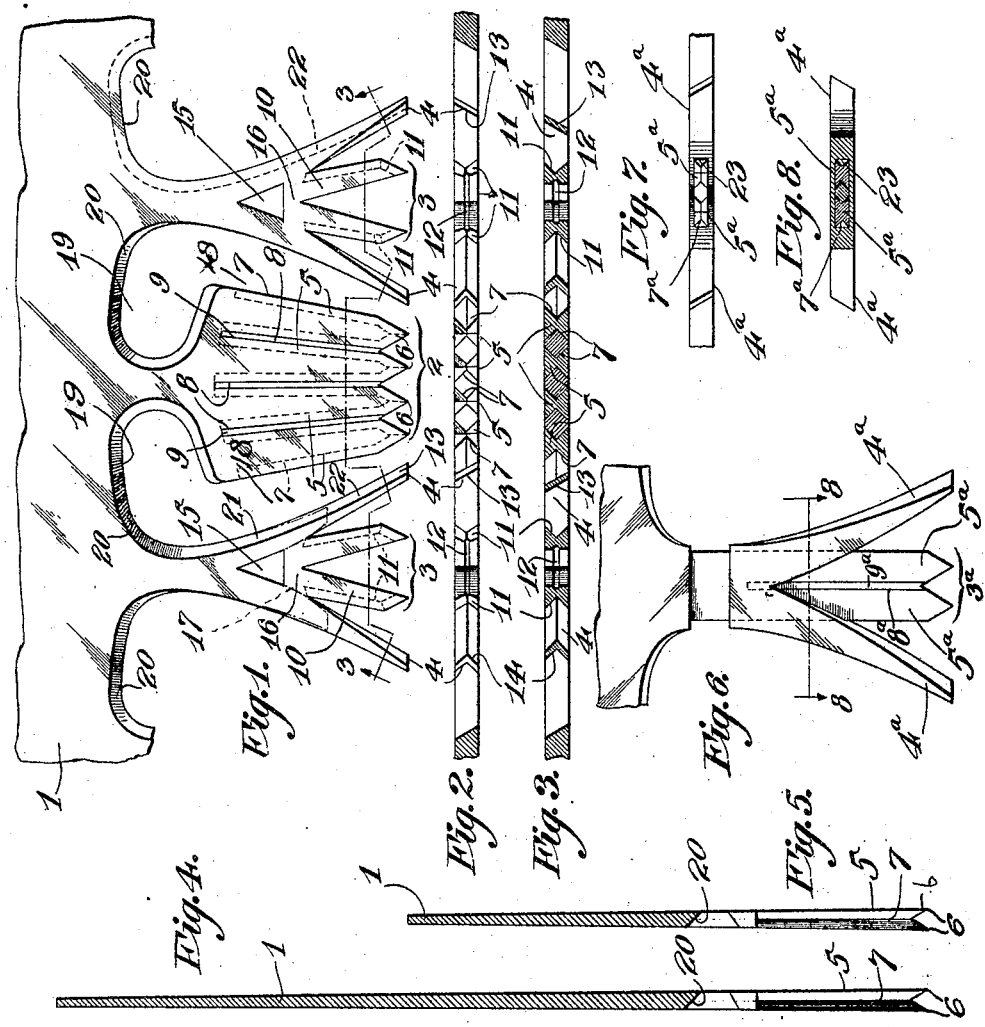
Witnesses:
Virgil L. Mares
George A. Gruss
Inventor
Louis Dragon
By Joshua R. H. Potts
His Attorney Jan. 20, 1925.
L. DRAGON
SAW
Filed Oct. 18, 1923   3 Sheets-Sheet 2
1,523,518
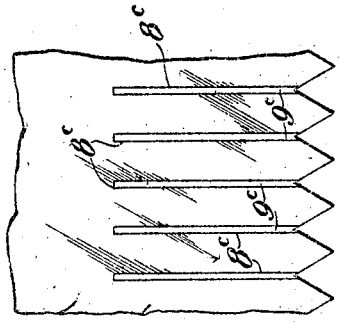
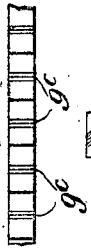
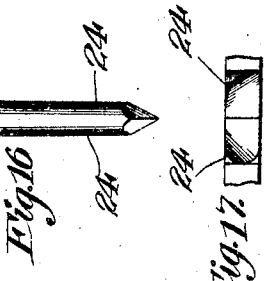
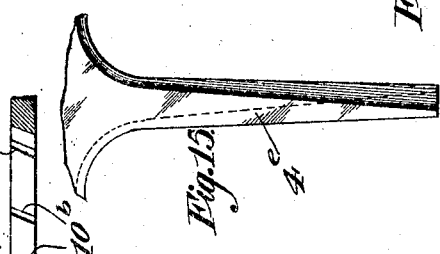
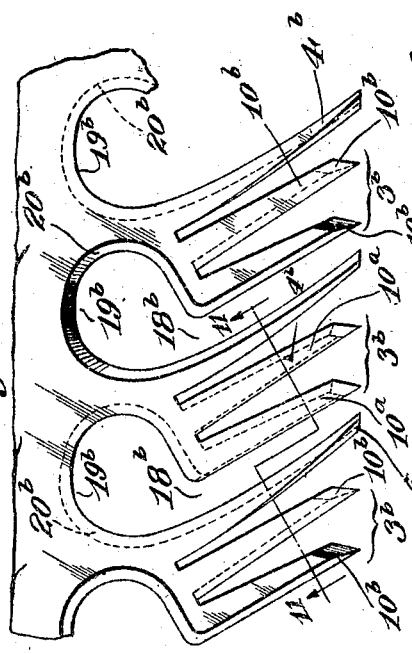
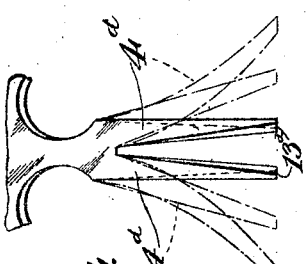
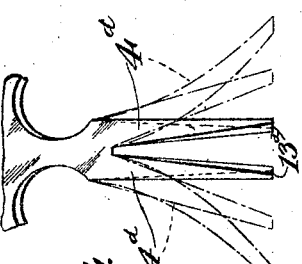
Witnesses:
Virgil L. Mares
George A. Gruss
Inventor
Louis Dragon
By Joshua R. H. Potts
his Attorney

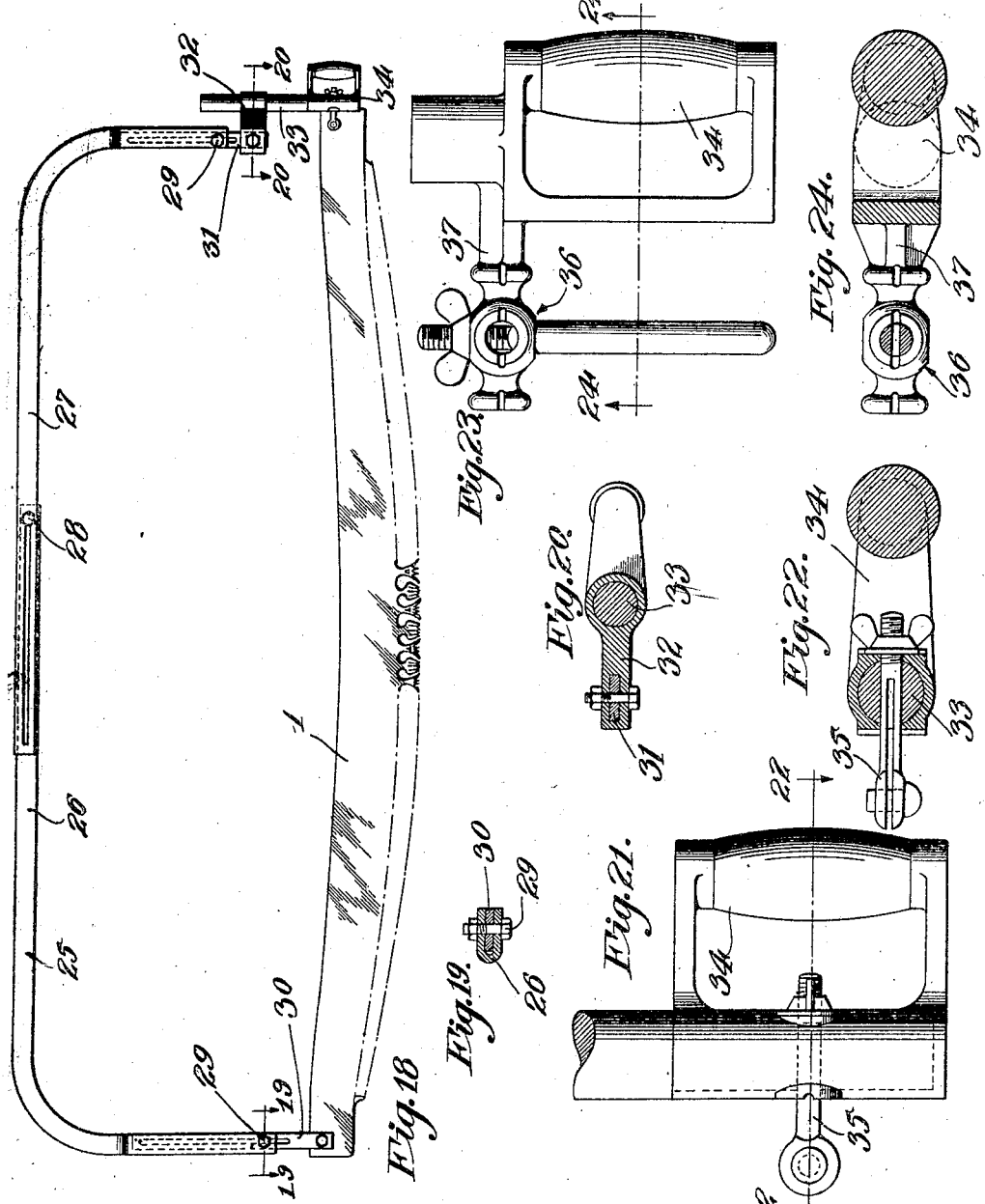

Patented Jan. 20, 1925.

1,523,518

UNITED STATES PATENT OFFICE.

LOUIS DRAGON, OF PHILADELPHIA, PENNSYLVANIA.

SAW.

Application filed October 18, 1923. Serial No. 669,254.

*To all whom it may concern:*

Be it known that I, LOUIS DRAGON, a subject of the King of Great Britain, residing at Philadelphia, in the county of Philadelphia and State of Pennsylvania, have invented certain new and useful Improvements in Saws, of which the following is a specification.

My invention relates to saws and its objects are to provide a saw which will cut faster, stay sharp longer, will not bind or stick while cutting, may be easily sharpened, will always have its teeth accurately set, and to provide a brace which will reinforce the blade, so that it may be made light, and adapt it for use by one man.

These objects, and other advantageous ends which will be described hereinafter, I attain in the following manner, reference being had to the accompanying drawings in which—

Figure 1 is a fragmentary side view of a saw blade having teeth constructed in accordance with my invention, Figure 2 a bottom view of Figure 1, Figure 3 a section on line 3—3 of Figure 1, Figure 4 a cross section through the center of the saw blade, Figure 5 a cross section through either of its ends, Figure 6 a fragmentary side view of a modified form of my invention showing how the teeth may be made adjustable, Figure 7 a bottom view of Figure 6, Figure 8 a section on line 8—8 of Figure 6, Figure 9 a modified form of the teeth shown in Figure 1, illustrating the same arranged for a one-man saw, Figure 10 a bottom view of Figure 9, Figure 11 a section on line 11—11 of Figure 9, Figure 12 a fragmentary side view of a blade having a modified form of my invention applied thereto, Figure 13 a bottom view of Figure 12, Figure 14 a modified form of the diverging raker teeth shown in Figure 1, Figure 15 a modified form of the single raker teeth shown in Figure 9, Figure 16 a modified form of cutting teeth, Figure 17 an enlarged bottom view of Figure 16, Figure 18 a side elevation of my improved saw having the stiffening brace thereon, Figure 19 a section on line 19—19 of Figure 18, Figure 20 a section on line 20—20 of Figure 18, Figure 21 an enlarged fragmentary view of the handle shown in Figure 18.

Figure 22 a section on line 22—22 of Figure 21,

Figure 23 a modified form of the handle shown in Figure 21, and

Figure 24 a section on line 24—24 of Figure 23.

Referring to the drawings, 1 indicates a blade which may be of any curvature and which has its sides tapering upwardly and inwardly from the lower to the upper edge. Teeth are formed in its lower edge with their sides in the same plane as the sides of the blade. The teeth include groups of cutting teeth 2 and 3 and raker teeth 4 between the groups. The cutting teeth and raker teeth may be arranged in any combination to meet the different requirements, but the construction of the teeth will be the same. The cutting teeth 5 of group 2 converge toward their pointed ends 6 and have V-shaped grooves 7 in their opposite edges. Slits 8 are left between the teeth. The slits and grooves are closed with a filler 9 such as lead, babbitt or other suitable material to reinforce the teeth and facilitate sharpening. Cutting teeth 10 of groups 3 differ from teeth 5 in having but one cutting face instead of two, the cutting face being provided with a V-shaped groove 11. Thus the grooves 7 of cutting teeth 5 produce four cutting edges, which are particularly adapted for a two-man saw, while the grooves 11 of teeth 10 produce but two cutting edges which are adapted for use on a one-man saw where the cutting action takes place only on the forward stroke. The teeth 10 may be provided with a small circular groove 12 on the edge opposite groove 11 to facilitate sharpening.

The raker teeth 4 have their raking edges 13 disposed at an incline to a lateral vertical plane perpendicular to the length of the blade. The raker ends 13 are inclined in one direction on one tooth and in the other direction on the adjacent tooth and so on alternately throughout the length of the saw. Raker teeth 4 may have their ends V-shaped as shown at 14. This type of tooth has a cutting edge on both sides while the raker tooth having the end 13 has a cutting edge on one side. The raker teeth 4 are preferably arranged to diverge as shown in Figure 1, and their shank is provided with an opening 15. The groups 3 of cutting teeth are integrally connected with the raker teeth beneath the opening as shown at 16. When the raker teeth and cutting teeth 10 are worn to a point adjacent opening 15 the cutting teeth and their integral connection 16 may be cut out to the opening so as to leave a pair of small diverging raker teeth as shown in dot-and-dash lines at 17 in Figure 1. Any number of these openings may be provided between the diverging raker teeth and arranged in any manner desired so long as the openings serve to shape the teeth after the cutting teeth are worn to their integral connection. The raker teeth are spaced from the groups 2 of cutting teeth to provide a space 18 for saw dust to enter. The saw blade 1 is provided with cut-out parts 19 which communicate with the spaces 18 and receive the saw dust as it passes through the spaces 18. The edges of the cut-out parts are beveled as shown at 20 to allow the saw dust, which is packed in the cut-out parts during the cutting stroke, to fall from the cut-out parts after they leave the cut. These beveled edges 20 of the cut-out parts merge into the raker teeth having the V-shaped ends 14, as shown at 21, and form a continuation of the beveled edges 20 where they meet with the inclined part of the tooth having the edge 13 as shown at 22. These cut-out parts 19, with their beveled edges 20, are especially desirable where a long cut is made as the cut-out parts allow the saw dust to accumulate during the cutting action and the beveled edges allow the saw dust to slip out of the cut-out parts after they leave the cut. The edges 20, as shown in the drawings, are beveled at one side but may be beveled on both sides.

In Figures 6 to 8 of the drawings, I have shown raker teeth $4^a$ provided with an opening 23 for bindingly fitting cutting teeth $5^a$ so that the raker teeth $4^a$ may be adjusted on the cutting teeth $5^a$. These raker teeth $4^a$ may be made of special hard steel while the cutting teeth $5^a$ may be of steel having tough and resilient properties. The raker teeth may be adjusted on the cutting teeth by a special tool which will fit between the teeth and struck with a hammer to force the teeth up or down on the cutting teeth. The raker teeth $4^a$ and cutting teeth $5^a$ are similar to those shown in Figure 1 and I have therefore given corresponding parts similar reference characters with the exponent "a".

In Figures 9 to 11, I have shown a combination of inclined teeth arranged for a one-man saw, that is the cutting takes place only on the forward stroke of the saw. The construction of the raker teeth and cut-out parts are similar to that shown in Figure 1, and I have therefore given corresponding parts similar reference characters with the exponent "b". The cutting teeth $10^a$ may be similar to the cutting teeth 10 shown in Figure 1, that is teeth having two cutting edges formed by a V-shaped groove in one of its edges, or may have but one cutting edge as shown at $10^b$. These teeth $10^b$ have one edge beveled. The end tooth of each group of teeth $10^b$ has its beveled edge merging into the beveled edge $20^b$ of the cut-out parts $19^b$.

In Figures 12 and 13, I have shown the blade of the saw provided with slits $8^c$ similar to the slits 8 shown in Figure 1 and teeth formed on the blade between the slits. The teeth may be similar to the ordinary hand saw teeth which are bent to one side and then to the other when set for cutting. The slit is closed with a filler $9^c$ of lead, babbitt or other material. These slits and the filler facilitate the sharpening of the teeth by providing a soft material where the corner of the file cuts.

In Figure 14, I have shown the raker teeth 4 of Figure 1 as straight instead of diverging as indicated by dot-and-dash lines. These teeth are similar in construction to those shown in Figure 1 and I have therefore given corrsponding parts similar reference characters with the exponent "d".

In Figure 15, I have shown a straight single tooth $4^e$. This tooth has the advantage of raking the saw dust on both of its sides during the forward and rearward stroke of the saw.

In Figures 16 and 17, I have shown the cutting teeth $10^b$ of Figure 9 provided with rounded edges 24. These edges may be rounded at both corners of the edge of the tooth or one corner as shown in Figure 17. The advantage of a tooth of this type is that the friction between the teeth and the sides of the cut is reduced to the minimum.

In Figures 18 to 22, I have shown a brace 25 for stiffening or reinforcing the blade of the saw. The brace consists of a pair of L-sections 26 and 27 secured to each other at 28 for horizontal adjustment. The sections are preferably channeled for rigidity and lightness as shown in Figure 19. These sections 26 and 27 are secured at 29 to uprights 30 and 31 for vertical adjustment, the uprights sliding in the channel of the sections as shown in Figure 19. Upright 30 is secured to one end of blade 1 and upright 31 is secured to a tab 32 fixed to a wooden rod 33 rigid with a handle 34. Handle 34 is secured to the other end of the saw blade in any suitable manner such as by a loop rod 35 passing through the handle and connected to the saw in the usual manner.

In Figures 23 and 24, I have shown the handle 34 provided with means 36 extended from its top, for connecting it to the saw, as shown at 37.

A saw constructed as above set forth will cut faster because the groups 2 of cutting teeth are provided with four cutting edges on each tooth and the teeth converge toward their points, thus allowing a large number of cutting edges to be made on a blade. The sharpening of the teeth is facilitated by providing the slits 8 with a filler so that the corner of the file which is the most ineffective part will not have to cut a hard substance, thereby preventing files from being worn at the corners and saving time and expense in sharpening the teeth. By providing the raker teeth at an incline to a lateral vertical plane perpendicular to the length of the blade, the saw dust which accummulates between the raker and cutting teeth will not stay packed but will be forced out by the vibrations of the saw after the teeth leave the cut. By providing the cutting teeth with grooves in their opposite edges, four cutting edges are produced on each tooth, thus increasing the number of cutting edges which makes the saw cut faster, doing away with the constant setting of the teeth which is required on the ordinary saw, and keeping a permanent and accurate set of the teeth at all times.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A saw having pointed cutting teeth provided with grooves in their opposite edges terminating at the point, and raker teeth between the cutting teeth.

2. A saw having pointed cutting teeth provided with V-shaped grooves in their opposite edges terminating at the point, and raker teeth between the cutting teeth.

3. A saw having groups of pointed cutting teeth provided with grooves in their opposed edges terminating at the point; a filler within the grooves, and raker teeth between the groups.

4. A saw having groups of converging cutting teeth, each of the cutting teeth being pointed and provided with grooves in its opposite edges terminating at the point, and raker teeth between the groups.

5. A saw including a blade provided with a pair of diverging raker teeth having an opening in their shank, and cutting teeth between the raker teeth and integrally connected therewith below the opening whereby when the cutting teeth are worn to the opening the raker teeth will retain their diverging shape.

6. A saw including a blade having teeth and slits leading into the blade from the opposed surfaces of the teeth, and a filler of softer material than the teeth in the slits whereby the opposed surfaces of the teeth may be easily sharpened.

In testimony whereof I have signed my name to this specification in the presence of two subscribing witnesses.

LOUIS DRAGON.

Witnesses:
EVELYN CROMPTON,
CHAS. E. POTTS.